United States Patent [19]
Ukon

[11] Patent Number: 6,139,772
[45] Date of Patent: Oct. 31, 2000

[54] LIQUID CRYSTAL COMPOSITION, CURED PRODUCT, AND MANUFACTURING METHOD THEREOF

[75] Inventor: Masakatsu Ukon, Tokyo, Japan

[73] Assignee: JSR Corporation, Tokyo, Japan

[21] Appl. No.: 09/130,108

[22] Filed: Aug. 6, 1998

[30] Foreign Application Priority Data

Aug. 7, 1997 [JP] Japan ..................................... 9-225650

[51] Int. Cl.$^7$ ............................ C09K 19/38; C09K 19/04
[52] U.S. Cl. ................................ 252/299.61; 252/299.62; 252/299.67
[58] Field of Search .................... 252/299.01, 299.61, 252/299.66, 299.67, 299.62; 428/1.1

[56] References Cited

U.S. PATENT DOCUMENTS

| | | | |
|---|---|---|---|
| 4,915,867 | 4/1990 | Morita et al. | 252/299.5 |
| 4,988,460 | 1/1991 | Morita et al. | 252/299.5 |
| 5,037,574 | 8/1991 | Frechet eat al. | 252/299.01 |
| 5,785,889 | 7/1998 | Greenfield et al. | 252/299.01 |
| 5,863,457 | 1/1999 | Hasebe et al. | 252/299.01 |

FOREIGN PATENT DOCUMENTS

| | | |
|---|---|---|
| 8-29618 | 2/1996 | Japan . |
| 8-75924 | 3/1996 | Japan . |
| 2 305 925 | 4/1997 | United Kingdom . |

OTHER PUBLICATIONS

Takashi Kato, et al., Macromolecules, vol. 29, No. 27, pp. 8734–8739, "Structures And Properties Of Supramolecular Liquid–Crystalline Side–Chain Polymers Built Through Intermolecular Hydrogen Bonds", Dec. 30, 1996.

Takashi Kato, et al., Macromolecules, vol. 25, No. 25, pp. 6836–6841, "Molecular Self–Assembly Of Liquid Crystalline Side–Chain Polymers Through Intermolecular Hydrogen Bonding. Polymeric Complexes Built From A Polyacrylate And Stilbazoles", Dec. 7, 1992.

*Primary Examiner*—Shean C. Wu
*Attorney, Agent, or Firm*—Oblon, Spivak, McClelland, Maier & Neustadt, P.C.

[57] ABSTRACT

A radiation polymerizable liquid crystal composition capable of producing various types of cured products possessing optical anisotropy with varying physical characteristics suitable is disclosed. The composition comprises an intermolecular hydrogen-bonded product which has liquid crystal properties and is comprised of a compound (A) having one or more hydrogen donor groups and a compound (B) having one or more hydrogen acceptor groups, wherein at least one of the compounds (A) or (B) has a radiation polymerizable functional group. A cured product is useful as a coating material, piezoelectric element, nonlinear optical element, microlenses, photoconductive cells, actuators, polarizing plates, orientating films, optical deflection prisms, and various optical filters.

17 Claims, No Drawings

LIQUID CRYSTAL COMPOSITION, CURED PRODUCT, AND MANUFACTURING METHOD THEREOF

BACKGROUND OF THE INVENTION

1. Field of the Invention

The present invention relates to a liquid crystal composition that is polymerizable by radiation, a cured product having optical anisotropy and available from said composition, and a manufacturing method thereof.

2. Description of the Background Art

In recent years, a controlled orientation arrangement of macromolecules has been required for products utilizing anisotropy in physical characteristics of polymers, such as coating materials, piezoelectric elements, nonlinear optical elements, microlenses, photoconductive cells, actuators, polarizing plates, orientating films, optical deflection prisms, and various optical filters. Also, a polymer film with a controlled orientation arrangement of molecules is desired as a compensation plate for liquid crystal displays to concurrently satisfy both improved quality and lighter weight.

A method of subjecting a liquid crystal composition containing a particular type liquid crystal acrylate compound to a orientation treatment and irradiating the oriented product with radiation (for example, Japanese Patent Application Laid-Open Nos. 29618/1996 and 75924/1996) is a known technique to respond to such a demand for the compensation plate.

However, this method requires synthesizing and formulating a liquid crystal composition in accordance with various required properties such as optical characteristics, heat resistance, mechanical characteristics, properties as a liquid crystal, and so forth. The above method therefore not only makes the process of preparing the liquid crystal composition complex, but also has the drawback of lacking the ability of being readily applied to the various devices mentioned earlier that require a controlled orientation structure of macromolecules in the same way as a compensation plate.

An object of the present invention is therefore to provide a radiation polymerizable liquid crystal composition which can produce a cured product possessing optical anisotropy via a simplified process.

Another object of the present invention is to provide a radiation polymerizable liquid crystal composition which can be prepared using a simple process.

Still another object of the present invention is to provide a radiation polymerizable liquid crystal composition capable of producing various types of cured products possessing optical anisotropy which can meet a variety of applications with little design restriction.

Yet another object of the present invention is to provide a cured product possessing optical anisotropy that can be prepared from the aforementioned liquid crystal composition, and a manufacturing method thereof.

SUMMARY OF THE INVENTION

The above object can be achieved in the present invention by a radiation polymerizable liquid crystal composition comprising an intermolecular hydrogen-bonded product which has liquid crystal properties and is comprised of (1) a compound (A) having one or more hydrogen donor groups and (2) a compound (B) having one or more hydrogen acceptor groups, wherein at least one of the compounds (A) or (B) has a radiation polymerizable functional group.

In a preferred embodiment of the present invention, said hydrogen donor group in the radiation polymerizable liquid crystal composition is a carboxyl group and said hydrogen acceptor group is a pyridyl group or carboxyl group.

The above objects can further be achieved in the present invention by a cured product possessing optical anisotropy that can be prepared by subjecting said liquid crystal composition to an orientation treatment and polymerizing the oriented product by radiation, and a process for manufacturing this cured product.

Other and further objects, features and advantages of the present invention will appear more fully from the following description.

DETAILED DESCRIPTION OF THE INVENTION AND PREFERRED EMBODIMENTS

The radiation polymerizable liquid crystal composition with intermolecular hydrogen bonds can be obtained by a remarkably simplified process in the present invention. Specifically, such a liquid crystal composition can be prepared by merely admixing a compound (A) having one or more hydrogen donor groups and another compound (B) having one or more hydrogen acceptor groups homogeneously, either in the absence or presence of a solvent.

Moreover, a cured product possessing optical anisotropy can be obtained by a simple process, for example, a process of having said composition placed between two sheets of substrate possessing an orientating film, thereby providing said composition with an orientating treatment to align the intermolecular hydrogen-bonded product, followed by irradiating said composition with radiation such as ultraviolet rays or electron beams so that a polymerization reaction is caused in the polymerizable functional group contained in at least one of the compounds (A) or (B).

Thus, the preparation of such a cured product is enabled with an extremely simplified over-all process comprising preparation of a radiation polymerizable liquid crystal composition and formation of a cured product possessing orientated anisotropy from such a composition.

Furthermore, various cured products possessing optical anisotropy, which can meet a variety of applications with little design restriction, can be obtained according to the present invention, because a wide choice is available on combining various types of the compound (A) and compound (B), as well as the compound (C) to be discussed later. At the same time, various cured products possessing optical anisotropy that are differing in physical properties such as mechanical characteristics and optical characteristics are available according to the present invention even using the same combination, because changes in temperatures at the time of irradiation cause phase alterations on a radiation polymerizable liquid crystal composition.

The hydrogen bond referred to in the present invention means a bond that is formed by a hydrogen atom intervening between two atoms. It is typically formed between an "X—H" group and a "Y" atom, expressed as X—H . . . Y, and takes a form such as O—H . . . O, O—H . . . N, N—H . . . O, N—H . . . C, O—H . . . Cl, N—H . . . F, F—H . . . F, N—H . . . N, and the like. The —H side is referred to as a hydrogen donor, and the other side, a hydrogen acceptor.

In the present invention, a hydrogen donor is referred to as the compound (A), and a hydrogen acceptor, the compound (B).

As a hydrogen donor group possessed by the compound (A), carboxyl group, hydroxyl group, aldehyde group, amide group, imide group and the like can be mentioned. Among the aforementioned, carboxyl group, and in particular, carboxyl group linked to an aromatic ring is preferred.

The compound (A) must have at least one hydrogen donor group, preferably one to three, and more preferably either one or two. In the case where the compound (A) contains two or more hydrogen donor groups, they may be either the same or different. The compound (A) having the same hydrogen donor groups is preferred.

The molecular weight of the compound (A) is preferably 100 to 2,000, and more preferably, 100 to 1,000.

As a hydrogen acceptor group possessed by the compound (B), nitrogen-containing heterocyclic groups such as pyridyl group, quinolyl group, and imidazole group, as well as amide group and imide group can be mentioned. Carbonyl group-containing groups such as an aldehyde group, carboxyl group, and the like can also be mentioned.

In the event that the hydrogen donor group is a carboxyl group, pyridyl group is a preferred hydrogen acceptor group. Moreover, a carboxyl group can form a hydrogen bond by itself. In particular, when the hydrogen donor group is a carboxyl group linked to an aromatic ring, the hydrogen acceptor group for forming a hydrogen bond may be a carboxyl group. In such a case, the compound (A) and the compound (B) may be an identical compound.

The number of hydrogen acceptor groups in the compound (B) is preferably one to three, and more preferably one or two. The molecular weight of the compound (B) preferably is 100 to 2,000, and more preferably 100 to 1,000.

At least one of the compounds (A) and (B) must have a radiation polymerizable functional group. The total per-molecule number of radiation polymerizable functional groups possessed by each compound (A) or (B) is preferably one to three, and more preferably, one or two. It is particularly preferable that either one or both of the compounds (A) and (B) possess one radiation polymerizable functional group.

As a radiation polymerizable functional group, there can be mentioned radical polymerizable groups such as an acryloyl group, methacryloyl group, vinyl group, vinyl ether group, norbornene group, and the like, as well as cationic polymerizable functional groups, including cyclic ether groups, such as an epoxide group, cyclohexeneoxide group, oxetane group, oxolane group, furan group, and the like; cyclic acetal groups, cyclic lactone groups, oxazoline groups, cyclic thioether groups, and the like. Among these, radical polymerizable groups, in particular, an acryloyl group, methacryloyl group, and vinyl ether group are preferred.

In a radiation polymerizable liquid crystal composition of the present invention, the compound (A) and the compound (B) form an intermolecular hydrogen-bonded product through hydrogen bonds. This intermolecular hydrogen-bonded product is liquid crystal. The temperature range in which the intermolecular hydrogen-bonded product of the present invention shows liquid crystal properties is preferably, but not limited to, −10 to 200° C.

In the present invention, it is desirable to blend the compound (A) and the compound (B), so that the hydrogen donor group and the hydrogen acceptor group exist in equal mole numbers. The mixing ratio of the compound (A) to the compound (B) is preferably 10–90 to 90–10, more preferably, 30–70 to 70–30, and particularly preferably, 40–60 to 60–40.

As a preferred compound (A), compounds that are represented by the following general formulae (1) and (2) can be mentioned:

 (1)

 (2)

wherein [Dn] indicates a hydrogen donor group, [Ra] a radiation polymerizable functional group or a hydrogen atom, [Sp] a spacer, and [Ms] a mesogen group, respectively. Meanwhile, α, β, and γ individually represent either 0 or 1. Specific examples of [Dn], [Ra], and [Sp] are given below:

[Dn]; —COOH,

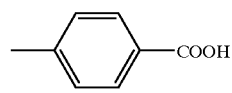

[Ra];
$CH_2=CHCOO—$,   $CH_2=C(CH_3)COO—$,
$CH_2=CHO—$,
$CH_2=CH—$,

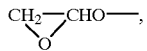

H—,

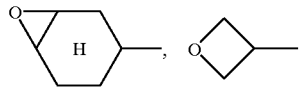

[Sp]; —(CH$_2$)$_k$—, —(CH$_2$CH$_2$O)$_k$—,

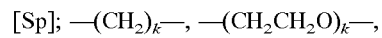

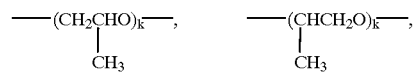

wherein k and m represent integers from 1 to 20, independently, and n is an integer from 0 to 20.

For the above-mentioned mesogen group, [Ms], compounds that are represented by the following general formula can be mentioned:

wherein [M1] and [M2] indicate, independently, a cyclic-structured divalent group as represented by the following formulae, [Cn] indicates a linking group, and δ and ε represent either 0 or 1, independently. [M1], [M2];

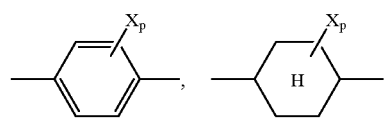

wherein X is a group to be chosen from F, Cl, Br, I, CN, CH$_3$ and NO$_2$, and p represents an integer from 0 to 4. When there exists a multiple number of X, the members may be identical or different.

As specific examples of [Cn] as the linking group, compounds as represented by the following formulae can be mentioned:
[Cn]; —CH=N—, —CH₂CH₂—, —C≡C—, —CH=CH——N=NO—, 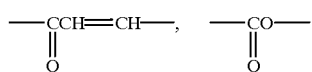
As specific examples of the preferred compound (A), compounds as represented by the following formulae can be mentioned:
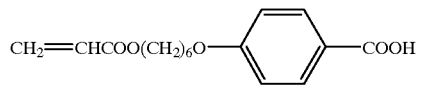
(A-1)
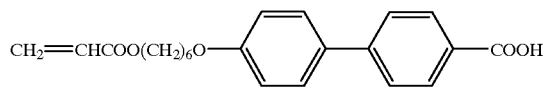
(A-2)
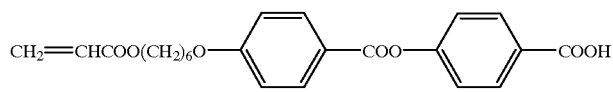
(A-3)
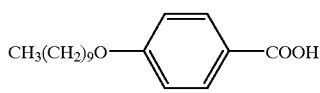
(A-4)
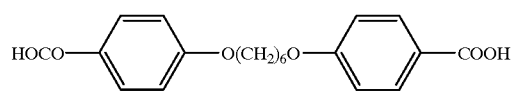
(A-5)
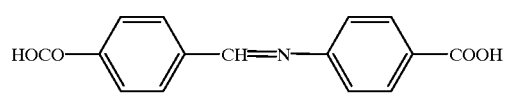
(A-6)
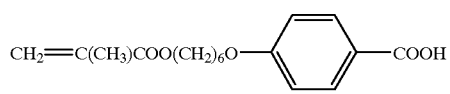
(A-7)
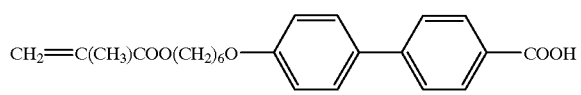
(A-8)
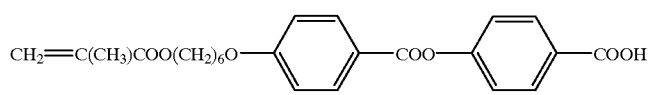
(A-9)
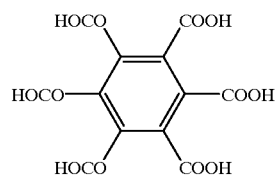
(A-10)

(A-11)

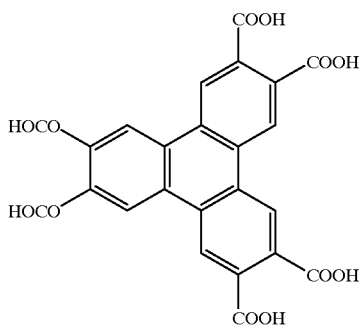

Meanwhile, as the preferred compound (B), compounds that are represented by the following general formulae (3) and (4) can be mentioned:

[Ra][Sp]α[Ms]β[Ac]  (3)

[Ac][Sp]α[Ms]β[Sp]γ[Ac]  (4)

wherein [Ac] indicates a hydrogen acceptor group, for which specific examples of preference are given below: [Ac];

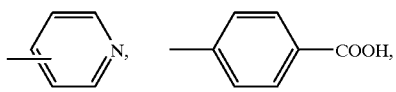

—COOH

In the above formulae (3) and (4), α, β, γ, [Ra], [Sp], and [Ms] have the same meanings as in the formulae (1) and (2) described earlier.

As specific examples of the preferred compound (B), compounds as represented by the following formulae can be mentioned:

(B-1)
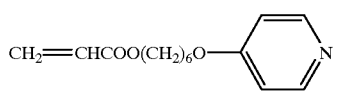

(B-2)
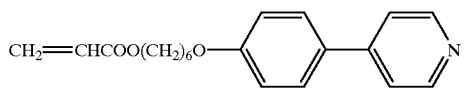

(B-3)
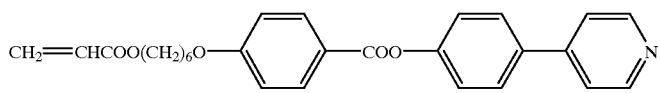

(B-4)
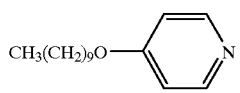

(B-5)
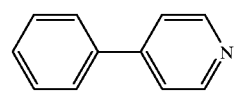

(B-6)
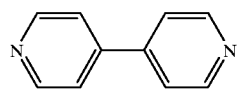

(B-7)
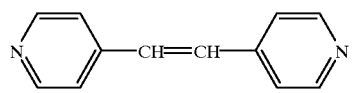

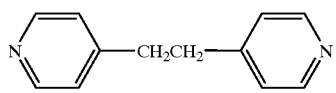
(B-8)

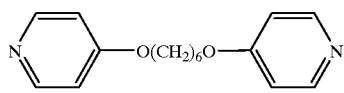
(B-9)

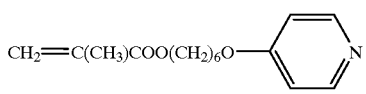
(B-10)

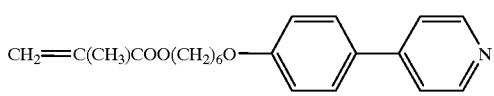
(B-11)

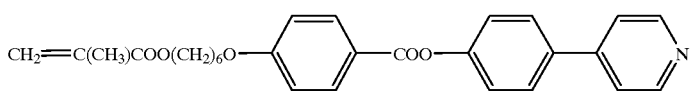
(B-12)

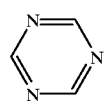
(B-13)

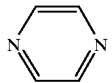
(B-14)

(B-15)

An intermolecular hydrogen-bonded product of the compound (A) and the compound (B) can be formed by blending the two compounds with heating or stirring as required. When blending, it is possible to dilute the mixture with a solvent which is removed later.

The temperature at which the resulting intermolecular hydrogen-bonded product shows liquid crystal properties will depend on the types of compound (A) and compound (B) to be combined.

The liquid crystal composition of the present invention may, in addition to the compound (A) and the compound (B), contain another liquid crystal compound (C) The liquid crystal compound (C) may include non-polymerizable as well as polymerizable liquid crystal compounds. The blending ratio of the liquid crystal compound (C) in the total combined quantity of the compounds (A), (B), and (C) is less than 80% by weight, with particularly preferred blending ratio being less than 50% by weight. Excessive use of the liquid crystal compound (C) could impair the characteristics of the intermolecular hydrogen-bonded product. As examples of the non-polymerizable liquid crystal compound (C), compounds as represented by the following formulae can be mentioned:

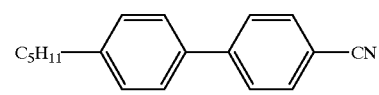
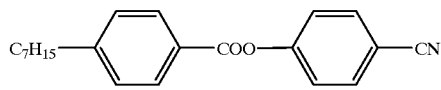
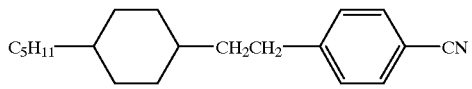
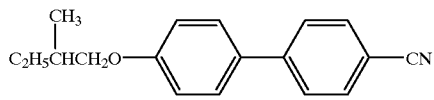
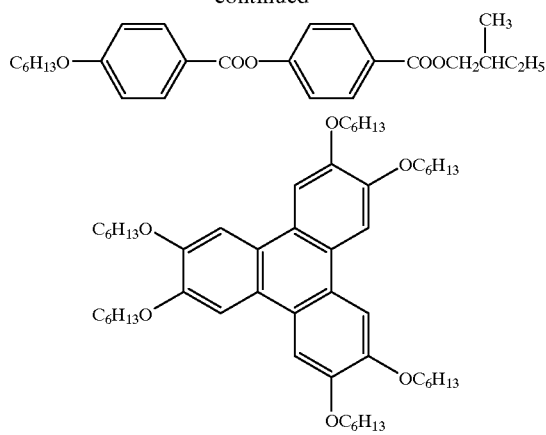
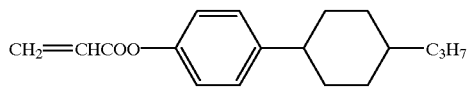
As examples of the polymerizable liquid crystal compound (C), compounds as represented by the following formulae can be mentioned:
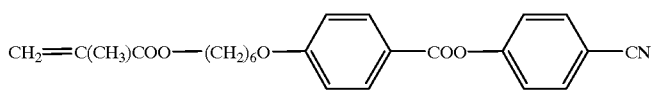
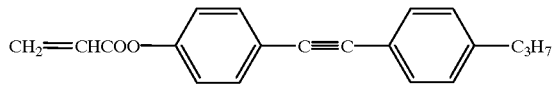
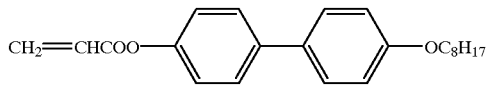
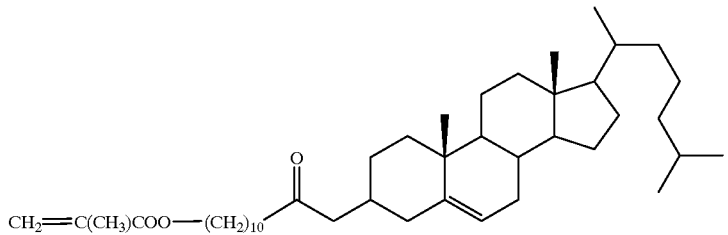
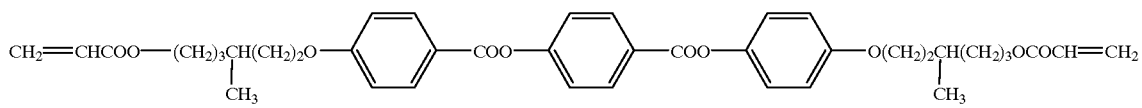
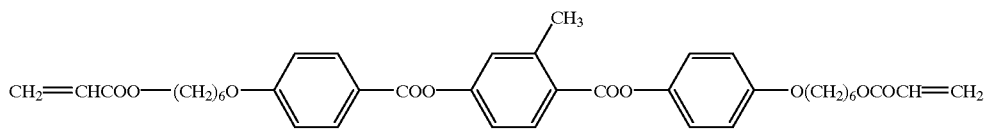

In addition to the above-mentioned intermolecular hydrogen-bonded product, the radiation polymerizable liquid crystal composition of the present invention may contain compounds that can polymerize with either the compound (A) or the compound (B), a photo-polymerization initiator, polymerization inhibitor, antioxidant, ultraviolet absorber, light stabilizer, coupling agent, aging preventive, dye, leveling agent, surfactant, plasticizer, lubricant, filler, wetting agent, coating surface improver, and others, provided that these additions will not harm the objects of the present invention.

To obtain a cured product possessing orientated anisotropy from a radiation polymerizable liquid crystal composition of the present invention, first, the composition is subjected to an orientating treatment within the temperature range wherein the intermolecular hydrogen-bonded product in the composition enters a liquid crystal state. The orientating treatment can be provided, for example, by having said composition placed between two sheets of substrate, one side of which possesses an orientating film such as a polyamide orientating film with a rubbing treatment. The sheets are arranged in such a way that the orientating films are facing each other with a desired amount of clearance. Other methods for providing the orientating treatment include application of a magnetic field or an electric field, fluid orientation by techniques such as shear deformation, and the like.

The orientating treatment causes a liquid crystal intermolecular hydrogen-bonded product to possess a particular orientation. The degree of the orientation can be conditioned by selecting the combination of intermolecular hydrogen-bonded products, their blending ratio, type and extent of the rubbing treatment.

Irradiating the radiation polymerizable liquid crystal composition after the orientating treatment with radiation such as electron beams, ultraviolet rays, infrared rays, visible rays, and X-rays will yield a cured product possessing orientated anisotropy with the preferred state of orientation maintained as in the above-mentioned liquid crystal intermolecular hydrogen-bonded product. While a device such as described in the above will yield a high polymer film with orientated anisotropy, naturally a variety of other shapes such as rods, granules, or others are optionally available by modifying the device as appropriate. Since there still remain hydrogen bonds in a cured product possessing orientated anisotropy, this product can be made into a cured product with a pseudo three-dimensional structure depending on the selection of the compounds (A) and (B).

Further, by making adjustments in the orientating treatment, cured product possessing optical anisotropy with different degrees of orientation become available, while irradiation given at temperatures outside of the range where an intermolecular hydrogen-bonded product exhibits liquid crystal properties will result in a cured product possessing optical anisotropy with varying physical characteristics, but exhibiting no orientation properties.

As described in the above, various cured products possessing optical anisotropy with varying physical characteristics to satisfy a variety of applications can be obtained from the radiation polymerizable liquid crystal composition of the present invention. This is achieved in a simple way by properly selecting the combination of the compound (A) and the compound (B), the degree of orientation in the liquid crystal intermolecular hydrogen-bonded product, polymerization temperature, radiation dosage, radiation intensity, and others.

The cured product possessing optical anisotropy produced from the radiation polymerizable liquid crystal composition of the present invention can possess orientation and anisotropy in physical properties such as modulus of elasticity, coefficient of linear expansion, glass transition point, refractive index, magnetic susceptibility, and the like. It can therefore be utilized in applications such as coating material, piezoelectric elements, nonlinear optical elements, microlenses, matrix polymers for PDLC, photoconductive cells, actuators, phase differential plates, polarizing plates, optical deflection prisms, various optical filters, and the like.

This invention is explained in more detail below referring to embodiment examples; however, this invention should not be construed to be limited therein.

EXAMPLES

Synthesis of Compound (1) as a Precursor of Compound (A-1)

As the precursor to 4-(acryloylhexyloxy) benzoic acid, a compound as represented by the formula (A-1) described earlier, 4-(6-hydroxyhexyloxy) benzoic acid as represented by the formula given below (hereafter called "compound (1)") has been synthesized using the following procedure:

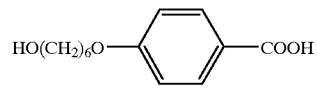

In 210 ml of ethanol was dissolved 138 g of p-hydroxy benzoic acid, and thereafter was added an aqueous solution of 90 g of potassium hydroxide dissolved in 90 ml of water. Subsequent to an addition of a small amount of potassium iodide, 150 g of 6-chlorohexanol was added to the above solution by dripping under reflux at 80° C. After allowing the mixture to react for 12 hours under reflux at 80° C., the reaction product was cooled to a room temperature, the precipitated potassium chloride was removed by filtration, and ethanol and water removed by evaporation under vacuum. 200 ml of water was added to the resultant mixture, which was then washed with 600 ml of toluene, and then brought to pH=1 with 1N hydrochloric acid. The white precipitate formed therein was filtered out to result in 190 g of crude product. This product was then refined with recrystallization using ethanol solvent to yield 140 g of the object compound (1).

Synthesis of Compound (A-1)

A mixture of 23 g of the compound (1) as synthesized in the above step, 60 ml of acrylic acid, and 4 g of p-toluenesulfonate in 200 g of toluene was prepared and allowed to react for 6 hours under reflux at 110° C., while continuously separating the water with a Deanstark water separator. Upon completion of the reaction, the reaction product was cooled to room temperature, the liquid reaction product was washed with water, and toluene removed by evaporation under vacuum to give 25 g of crude product. The crude product was then refined with recrystallization using iso-propanol solvent to yield 17 g of the object compound (A-1).

Examples 1–5

Preparation of Liquid Crystal Intermolecular Hydrogen-bonded Product

Each of the corresponding liquid crystal intermolecular hydrogen-bonded products between the compound (A-1)

synthesized as in the above step and the pyridine derivatives, as represented by the formulae (B-5) through (B-8) described earlier, was prepared using the following procedure:

The compound (A-1) and the pyridine derivatives (B-5) through (B-8) were blended according to the mixing ratios given in Table 1, and filled into respective reaction vessels. 0.5% by weight of 2,6-di-t-butyl-4-methylphenol as a polymerization inhibitor and 1% by weight of 1-hydroxycyclohexyl phenyl ketone as a photo-polymerization initiator were then added to the mixtures. The mixtures were heated and stirred until liquid and then cooled to a room temperature to yield corresponding liquid crystal intermolecular hydrogen-bonded products between the compound (A-1) and each of the pyridine derivatives. The percentage figures given above are for the total quantity of the compound (A-1) and the pyridine derivative combined.

Measurement of Phase Transition Temperature of the Liquid Crystal Intermolecular Hydrogen-bonded Products Each of the liquid crystal intermolecular hydrogen-bonded products (polymerizable liquid crystal compositions) as prepared in the above-mentioned step was placed between two sheets of slide glass, each possessing a polyimide orientating film with a rubbing treatment on one side and arranged in such a way that the orientating films were facing each other with a clearance of 5.5 $\mu$m as supported by glass beads. The two slide glass sheets were placed so that the directions of the rubbing treatment on each side made a 180-degree angle. The temperature $T_{m1}$ for phase transition from a crystal state to a liquid crystal state and the temperature $T_{m2}$ for phase transition from the liquid crystal state to an isotropic liquid state of the above liquid crystal intermolecular hydrogen-bonded products sandwiched between the two slide glass sheets were measured using a polarizing microscope (manufactured by Nikon) and a heating stage (manufactured by Metler). The results are given in Table 1.

The results in Table 1 demonstrate that the liquid crystal intermolecular hydrogen-bonded products in Examples 1 through 5 will effect a liquid crystal status at wide temperature ranges.

Radiation Polymerization of the Liquid Crystal Intermolecular Hydrogen-bonded Product Two slide glass sheets with the orientating treatment provided in the same manner as in the above measurement of the phase transition temperature were positioned facing each other with a clearance of 20 $\mu$m. The liquid crystal intermolecular hydrogen-bonded products prepared in the above-mentioned examples were placed between the above sheets. In a heating stage, the sheet units were heated and maintained at temperatures where each respective liquid crystal intermolecular hydrogen-bonded product exhibited a uniform orientation, and then subjected to radiation polymerization by irradiating ultraviolet rays at a dose of 500 mJ/cm$^2$ using a UV lamp (made by ORC Co., Ltd.). Thereafter, the units were cooled to room temperature and the slide glass sheets were stripped off to eventually obtain cured films.

The liquid crystal intermolecular hydrogen-bonded products were evaluated for their orientation characteristics and the phase transition temperatures using the polarizing microscope and the heating stage. The results are as given in Table 1.

Phase Transition Temperatures after Polymerization

Polymers obtained in the radiation polymerization of the liquid crystal intermolecular hydrogen-bonded products in the above procedure were tested for temperatures at which they lose orientation, in a manner similar to the measurement of phase transition temperatures for liquid crystal intermolecular hydrogen-bonded products. The results, as represented by $T_p$, are given in Table 1.

Orientation Characteristics of the High Polymer

The orientation characteristics of the high polymers obtained were evaluated with the following two ratings, which are indicated in Table 1:

◯: Polymer showed uniform orientation aligned in the same direction as the orientating treatment X: The orientation before curing was disturbed and the high polymer showed uneven orientation

TABLE 1

|  | Example | | | | |
|---|---|---|---|---|---|
|  | 1 | 2 | 3 | 4 | 5 |
| Compound A (mg) (A-1) | 88 | 88 | 88 | 88 | 88 |
| Compound B (mg) | | | | | |
| (B-5) | 23 | 46 | | | |
| (B-6) | | | 23 | | |
| (B-7) | | | | 27 | |
| (B-8) | | | | | 28 |
| Phase transition temperatures of hydrogen-bonded products (° C.) | | | | | |
| $T_{m1}$ | 30 | 30 | 91 | 106 | 125 |
| $T_{m2}$ | 76 | 48 | 129 | 143 | 165 |
| Temperatures at which the polymers lose orientation (° C.) $T_p$ | 175 | 187 | 202 | 205 | 210 |
| Orientation characteristics of the high polymers | ◯ | ◯ | ◯ | ◯ | ◯ |

The above results show that: (1) the polymers obtained by providing the radiation polymerizable liquid crystal composition of the present invention with an orientating treatment to cause the liquid crystal intermolecular hydrogen-bonded product to be orientated, followed by radiation polymerization, exhibit orientation, and that (2) such polymers possess varying physical characteristics such as orientation characteristics, phase transition temperatures, and the like, depending on the type of the pyridine derivatives (B-5) through (B-8) to be used in combination with the compound (A-1).

The present invention provides polymers with varying physical characteristics suitable for respective uses, and in particular, radiation polymerizable liquid crystal compositions from which various types of cured products possessing optical anisotropy can be obtained via a simplified process with little design restriction. The present invention also provides cured products possessing optical anisotropy that can be prepared from the above liquid crystal compositions and used for a variety of applications.

Obviously, numerous modifications and variations of the present invention are possible in light of the above teachings. It is therefore to be understood that within the scope of the appended claims, the invention may be practiced otherwise than as specifically described herein.

What is claimed is:

1. A radiation polymerizable liquid crystal composition comprising an intermolecular hydrogen-bonded product which has liquid crystal properties and is comprised of a monomer compound (A) having one or more carboxyl groups as hydrogen donor groups and a monomer compound (B) having one or more pyridyl groups as hydrogen acceptor groups, wherein at least one of the monomer compounds (A) or (B) has a radiation polymerizable functional group.

2. The radiation polymerizable liquid crystal composition according to claim 1, wherein said radiation polymerizable functional group selected from the group consisting of acryloyl group, methacryloyl group, vinyl group, vinyl ether group, norbornene group, epoxide group, cyclohexeneoxide group, oxetane group, oxolane group, furan group, cyclic lactone groups, oxazoline groups, and cyclic thioether groups.

3. The radiation polymerizable liquid crystal composition according to claim 1, comprising the monomer compound (A) and the monomer compound (B) in a proportion such that the hydrogen donor group and the hydrogen acceptor group exist in equal mole numbers.

4. The radiation polymerizable liquid crystal composition according to claim 1, wherein the monomer compound (A) is one of the monomer compounds represented by the following formulae (A-1) to (A-11):

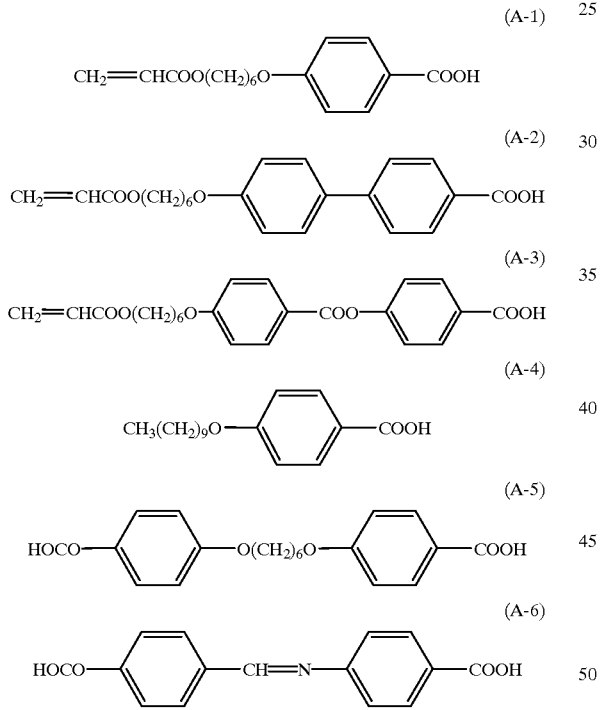

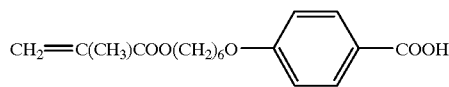
(A-7)

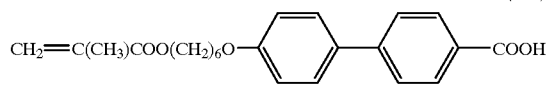
(A-8)

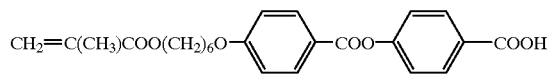
(A-9)

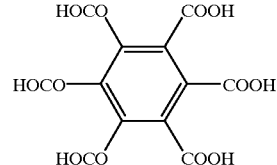
(A-10)

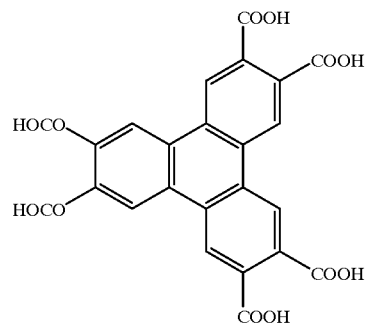
(A-11)

5. A radiation polymerizable liquid crystal composition comprising an intermolecular hydrogen-bonded product which has liquid crystal properties and is comprised of a monomer compound (A) having one or more hydrogen donor groups and a monomer compound (B) having one or more hydrogen acceptor groups, wherein at least one of the monomer compounds (A) or (B) has a radiation polymerizable functional group and wherein the monomer compound (B) is one of the monomer compounds represented by the following formulae (B-1) to (B-15):

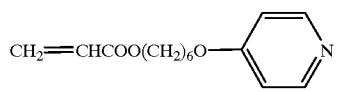
(B-1)

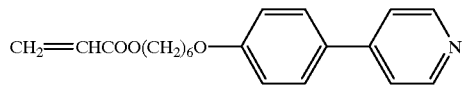
(B-2)

-continued
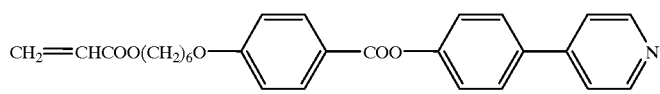
(B-3)
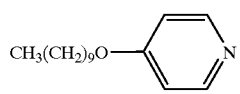
(B-4)
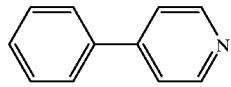
(B-5)
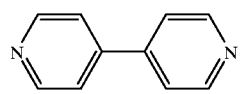
(B-6)
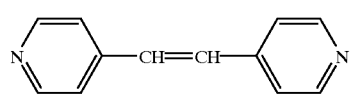
(B-7)
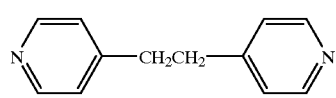
(B-8)
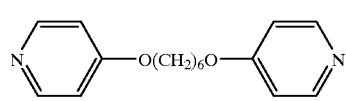
(B-9)
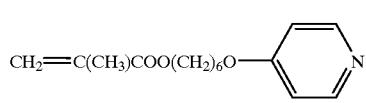
(B-10)
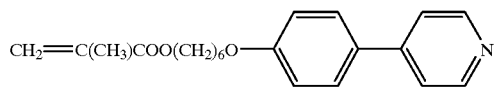
(B-11)
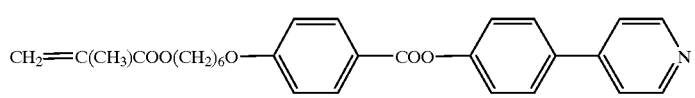
(B-12)
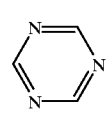
(B-13)
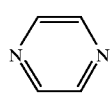
(B-14)

-continued

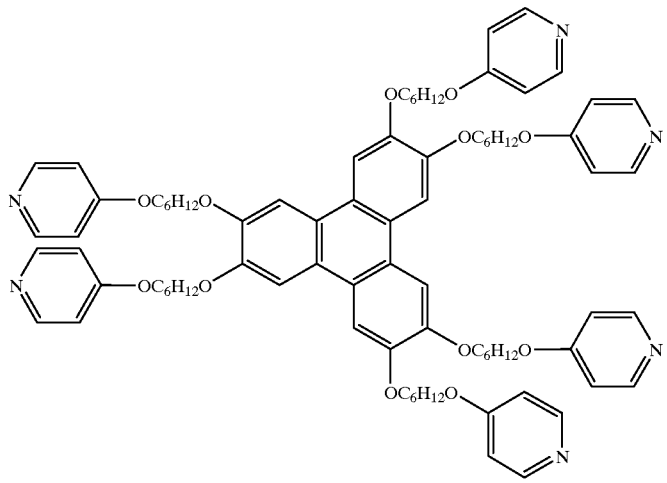
(B-15)

6. The radiation polymerizable liquid crystal composition according to claim 1, wherein the intermolecular hydrogen-bonded product exhibits liquid crystal characteristics at a temperature range from −10 to 200° C.

7. A cured product possessing optical anisotropy which is prepared by subjecting the composition of claim 1 to an orientation treatment and polymerizing the oriented product by radiation.

8. The cured product according to claim 7, wherein said orientating treatment comprises having said composition placed between two sheets of substrate, one side of which possesses an orientating film provided with a rubbing treatment, the two sheets being arranged in such a way that the orientating films are facing each other with a desired amount of clearance.

9. A process for preparing a cured product possessing optical anisotropy from the composition of claim 1, comprising subjecting the composition of claim 1 to an orientation treatment and polymerizing the oriented product by radiation.

10. The process according to claim 9, wherein said orientating treatment comprises having said composition placed between two sheets of substrate, one side of which possesses an orientating film provided with a rubbing treatment, the two sheets being arranged in such a way that the orientating films are facing each other with a desired amount of clearance.

11. A process for preparing a radiation polymerizable liquid crystal composition comprising an intermolecular hydrogen-bonded product which has liquid crystal properties, the process comprising providing a monomer compound (A) having one or more carboxyl groups as hydrogen donor groups and a monomer compound (B) having one or more pyridyl groups as hydrogen acceptor groups, wherein at least one of the monomer compounds (A) or (B) has a radiation polymerizable functional group, and mixing the monomer compound (A) and the monomer compound (B) homogeneously.

12. The radiation polymerizable liquid crystal composition according to claim 1, wherein a molecular weight of the monomer compound (A) is between 100 and 2000.

13. The radiation polymerizable liquid crystal composition according to claim 1, wherein a molecular weight of the monomer compound (B) is between 100 and 2000.

14. The radiation polymerizable liquid crystal composition according to claim 5, wherein a molecular weight of the monomer compound (A) is between 100 and 2000.

15. The radiation polymerizable liquid crystal composition according to claim 1, wherein a molecular weight of the monomer compound (B) is between 100 and 2000.

16. The process for preparing the radiation polymerizable liquid crystal composition according to claim 11, wherein a molecular weight of the monomer compound (A) is between 100 and 2000.

17. The process for preparing the radiation polymerizable liquid crystal composition according to claim 11, wherein a molecular weight of the monomer compound (B) is between 100 to 2000.

* * * * *